United States Patent [19]
Raddi et al.

[11] Patent Number: 4,673,825
[45] Date of Patent: Jun. 16, 1987

[54] UNINTERRUPTIBLE POWER SUPPLY WITH ISOLATED BYPASS WINDING

[75] Inventors: William J. Raddi; Robert W. Johnson, Jr.; John G. Tracy; Blazej W. Sonnenberg, all of Raleigh, N.C.

[73] Assignee: Exide Electronics Corporation, Raleigh, N.C.

[21] Appl. No.: 702,313

[22] Filed: Feb. 15, 1985

[51] Int. Cl.$^4$ .............................................. H02J 9/06
[52] U.S. Cl. ........................................ 307/66; 307/87
[58] Field of Search ................... 307/64, 65, 66, 46, 307/48, 83, 85, 86, 87

[56] References Cited

U.S. PATENT DOCUMENTS

| | | | |
|---|---|---|---|
| 3,339,082 | 8/1967 | Rhyne | 307/64 |
| 3,614,461 | 10/1971 | Speer et al. | 307/66 X |
| 3,745,365 | 7/1973 | Spreadbury et al. | 307/64 |
| 3,771,012 | 11/1973 | Neiderjohn | 307/66 X |
| 3,778,634 | 12/1973 | Hanrihan | |
| 4,010,381 | 3/1977 | Fickenscher et al. | 307/66 |
| 4,216,385 | 8/1980 | Omura et al. | |
| 4,238,691 | 12/1980 | Ebert | 307/66 |
| 4,241,261 | 12/1980 | Ebert | 307/64 X |
| 4,475,047 | 10/1984 | Ebert | 307/66 |
| 4,510,401 | 4/1985 | Legoult | |
| 4,556,802 | 12/1985 | Harada et al. | 307/66 |

FOREIGN PATENT DOCUMENTS

| | | |
|---|---|---|
| 74910 | 3/1983 | European Pat. Off. . |
| 671954 | 5/1952 | United Kingdom . |
| 1477051 | 6/1977 | United Kingdom . |

OTHER PUBLICATIONS

"AC-Triport—A New Uninterruptible AC Power Supply" by R. Rando INTELEC 78 pp. 50–58 (1978).

*Primary Examiner*—William M. Shoop, Jr.
*Assistant Examiner*—Sharon P. Logan
*Attorney, Agent, or Firm*—Eugene Chovanes

[57] ABSTRACT

An uninterruptible power supply including a transformer having a first input winding normally coupling an inverter AC source with a critical AC load, which transformer also includes a second input winding operable to supply power from a bypass source to the load in the event of malfunction of the inverter circuit. The inverter is of the four-quadrant pulse-width-modulated type, thereby to permit recharging of the battery which serves as the DC source to the inverter. An inductance is provided for varying the phase relationship between a utility voltage source and the inverter voltage to produce minimum real inverter current and the "break-even" operating conduction, and a step-up device is provided for increasing the utility voltage to further minimize the break-even inverter current required during normal operation, and to maximize the through-put efficiency.

8 Claims, 18 Drawing Figures

UNINTERRUPTIBLE POWER SUPPLY WITH ISOLATED BYPASS WINDING

BRIEF DESCRIPTION OF THE PRIOR ART

There are many applications in which it is becoming increasingly important to assure that equipment will be supplied with an uninterrupted AC supply voltage, and that this voltage will be a substantially pure and substantially noise-free sinewave of predetermined fixed frequency. The usual utility power lines are intended to provide such a supply voltage, but are subject to complete power outages, to reduction in voltage level, to surges which cause the voltage to raise above the normal level and to various types of interfering noise picked up by the power lines.

For many purposes such inadequacies of the power lines are relatively harmless, or at most inconvenient. However, with other more critical loads, for example computer apparatus, any of the foregoing departures of the power line from a constant, fixed-frequency, substantially noise-free sinewave both "normal" and "common" mode can cause loss of stored information and/or improper handling of information by the load apparatus, either of which can have very serious deleterious results.

Various types of power supply systems have been proposed in the prior art which will operate, in one degree or another, to mitigate one or more of the foregoing defects in the line voltage supply. One of these is the so-called uninterruptible power supply (UPS) equipment and employs a battery charger, a battery and an inverter connected in tandem with each other, the charger being supplied from the AC power line and the inverter supplying AC to the computer or other critical load. The power line keeps the battery adequately charged despite small over-voltages, under-voltages or interfering noise of the utility line, and the inverter utilizes the stored energy of the battery to produce substantially pure single-frequency sinewaves of constant amplitude for supply to the critical load. In the event of long term power line failure, the battery and inverter will maintain the desired AC current and voltage at the load for a substantial period of time, after which discharge of the battery can be detected and the equipment appropriately shut down, its use discontinued, or other protective measure taken, such as shifting to other standby power.

While quite effective for its purpose, there are times when unusual load demands are placed on the inverter portion of the UPS. Since the inverter has a finite impedance, the output voltage will sag when heavy loads such as motor starting or load short that may happen from time to time. During these heavy load demands the output voltage will drop to unacceptable levels. To solve this problem UPS equipment will bypass the load, i.e., disconnect the load from the UPS inverter output and connect it to an alternate source (bypass source) that has several orders of magnitude lower source impedance to supply the heavy load demands required without sagging the output voltage. The problem with bypass is that the load is now operating from the very source that prompted the use of the UPS in the first place. Experience has shown that modern computers and other sensitive equipment are more susceptible to the common mode noise than to the normal mode noise from the fluxuating utility.

SUMMARY OF THE INVENTION

Accordingly, a primary object of the present invention is to provide an improved uninterruptible power supply system including transformer means having an output winding connected with the load, and a pair of input windings, a first AC source including a battery and an inverter, a bypass second AC source, and transfer switch means for alternately connecting and disconnecting said first source with said first input winding, and for alternately disconnecting and connecting said bypass second source with said second input winding, respectively. By the use of an isolated bypass winding, maximum protection of the load is achieved even in the bypass mode, since when it is necessary to transfer to the bypass mode, prevention of common mode noise is continued. Moreover, by this construction, source voltage is allowed to differ from bypass voltage and from load voltage.

Another object of the present invention is to provide an efficient uninterruptible power supply and line conditioner which provides the desired alternating-current voltage for the critical load, yet does not require a separate charger and inverter and therefore is more efficient and less expensive than those systems which require such apparatus.

Uninterruptible power supply and line conditioner systems have been developed recently in which the utility line is coupled to the load and to the inverter output by way of series inductance, and in which the inverter comprises a bidirectional pulse-width modulation (PWM) sinewave inverter connected between the battery and the load. In such systems the phase of the sinewave generated can be varied as desired with respect to the phase of the utlity line voltage, thereby varying the magnitude and phase of the contribution of the inverter current to the load current. In a typical operation, this phase angle may be set, and preferably automatically maintained, at a value sufficient to supply the power demanded by the load, plus any losses in the system, plus any amount of power which it is desired to supply to the battery to maintain it charged or to recharge it.

Typically, the magnitude of the alternating-current voltage supplied to the load from the utility line, and hence also supplied to the output terminals of the inverter, is substantially equal to the utility line voltage itself. Thus where the coupling between the inverter output, the load terminals and the utility line terminals is by way of three corresponding windings of a transformer, the ratio of the turns of the winding connected to the utility line is equal to the number of turns coupled to the load terminals; that is, the ratio of the turns is 1:1 based on the concept that the load equipment is to be supplied with the same alternating voltage as is present on the power lines. While this arrangment will operate, it has been found that, for reasons set forth hereinafter, such a system, during normal "break even" operation, has its minimum inverter current under zero load conditions, and with a load present has a substantially greater-than-minimum inverter current; with a lagging load power factor, the required inverter current (and consequent inverter size) can become very great, and the system is therefore unduly expensive. Furthermore, its through-put efficiency is, in general, not the maximum obtainable.

Accordingly, a further object of the present invention is to provide an uninterruptible power supply and line conditioner of the type which employs an inductance through which the utility line voltage is fed to the inverter output and the load terminals, an in which the inverter is of the four-quadrant PWM sinewave type, but in which the inverter current required for normal operation near the "break even" operating point is minimized and through-put efficiency of the system maximized.

It is a further object of the invention to provide such a system in which isolation is maintained between and among the load, the inverter output terminals and the line voltage terminals.

BRIEF DESCRIPTION OF THE DRAWING

Other objects and advantages of the invention will become apparent from a study of the following specification, when viewed in the light of the accompanying drawing, in which.

DETAILED DESCRIPTION

Figures 1, 2, 3:
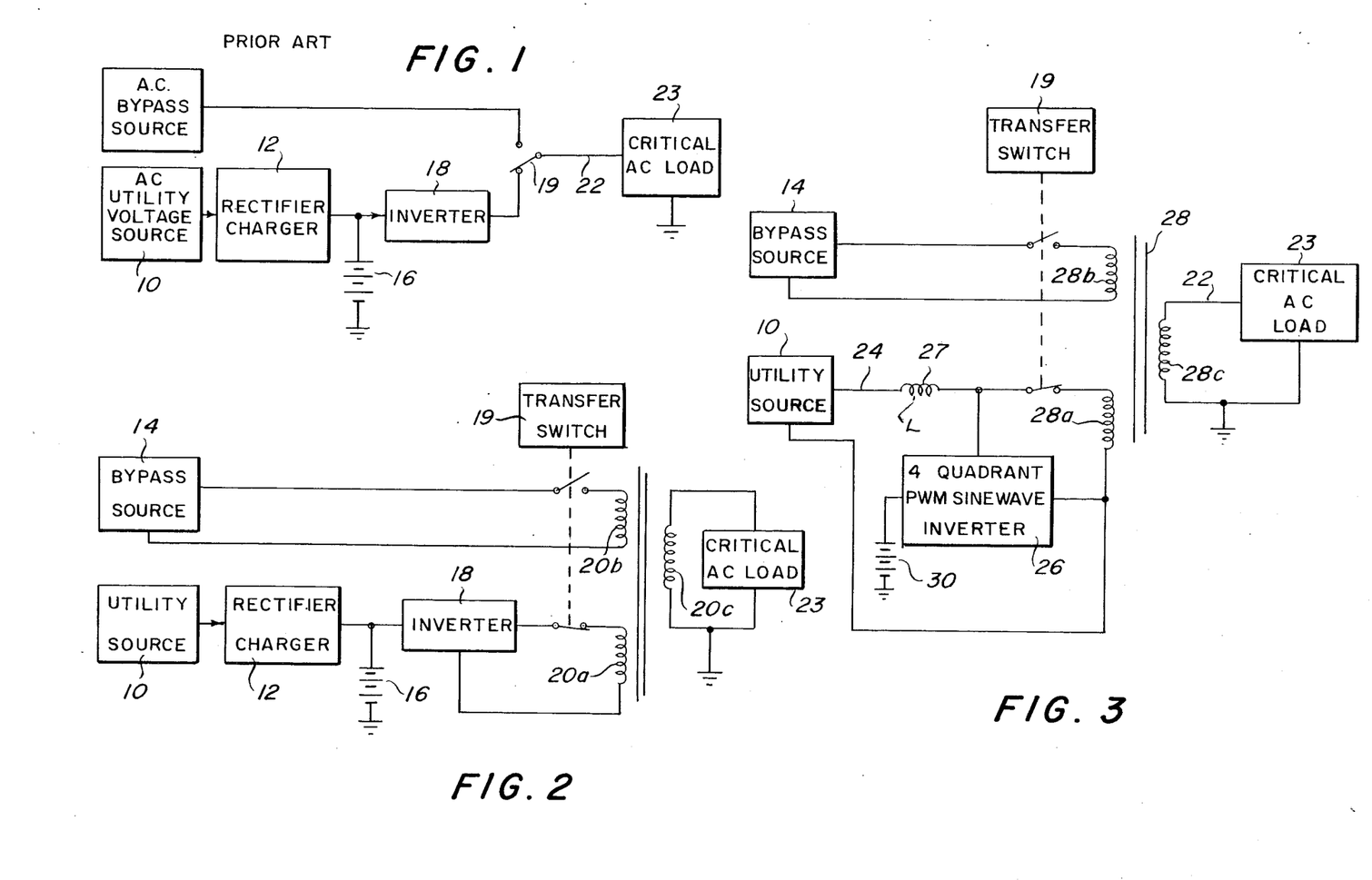
FIG. 1 is a block diagram of a power supply system of the prior art including an inverter for supplying a stabilized alternating-current voltage to a critical load.
FIG. 2 is a block diagram of a basic power supply system according to the present invention including transformer means having an isolated bypass winding for coupling the power sources with the load.
FIG. 3 is a block diagram of a modification of the power supply system of FIG. 2, including inductance means connected in series in the utility line for power factor control.

Referring first to the system of the prior art illustrated diagrammatically in FIG. 1, the alterna- ting-current utility or supply voltage source 10 is connected with a rectifier/charger 12 which converts the alternating-current voltage to a direct-current voltage so as to charge a battery 16. The voltage across the latter battery is then utilized to operate an inverter 18, which converts the DC voltage of the battery to an alternating-current voltage and supplies it via transfer switch 19 and output line 22 to the critical AC load 23. With this system, the utility line can be disconnected for substantial periods while the inverter continues to supply the desired alternating voltage, while at the same time substantial protection is provided against interfering noise, current surges, momentary voltage drops and irregularities in the waveform of the utility line voltage. In the event a heavy load occurs when the bypass source 14 is available, the unit will transfer load to bypass 14 via transfer switch 19.

FIG. 2 is similar to FIG. 1, but a transformer 20 provides means for alternately coupling the inverter or bypass sources with the critical load, respectively. The transformer 20 serves to provide different bypass and utility voltages as well as providing a different critical load voltage. The transfer switch 19 defines the means for rapidly changing the source of power.

FIG. 3 is a diagram, similar to FIG. 2, illustrating one embodiment of the present invention. In this case the utility line 24 supplies alternating-current voltage to the four-quadrant pulse width modulated sinewave inverter 26 via a series inductor 27, and the output of the inverter is connected via the transformer coupling means 28 to the critical load 23. The battery 30 is connected to the inverter, and the inverter determines how much of the critical load current is supplied from the utility line and how much from the battery, and how much of the inverter current is supplied to charge the battery.

This figure is shown in normal operation; when operating in the bypass mode the transfer switch 19 is closed to connect bypass source 14 with the transformer coupling means 28, and to simultaneously disconnect the utility source 24.

In addition, the present invention, as shown in FIG. 3, represents an improvement in the general type of system illustrated in FIG. 2.

The construction and operation of a system in accordance with FIG. 3 will now be explained and described, after which the improvement thereon according to the present invention will be set forth in greater detail.

Figures 4, 5:
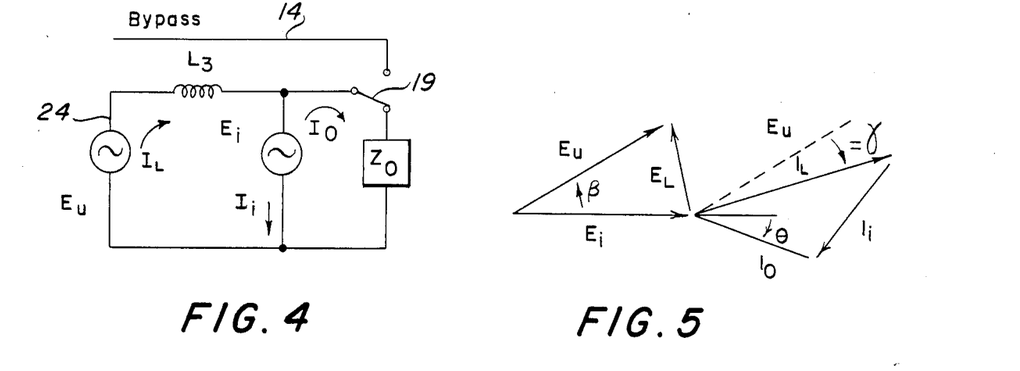
FIG. 4 is an equivalent electrical circuit diagram of the system of FIG. 3.
FIGS. 5 and 6 are vector diagrams illustrating the operation of the apparatus of FIGS. 3 and 4.

FIG. 4 is a simplified equivalent circuit for the general arrangement of FIG. 3, depicting the utility line voltage $E_U$, the series inductance $L_s$ through which the current $I_i$ flows, and the critical load $Z_o$ to which the load current $I_o$ is supplied. The inverter and critical load are effectively in parallel with each other, and supplied with voltage from the utility line 24 by way of series inductor $L_S$.

The generalized phase diagram for such a circuit is shown in FIG. 5 for the case in which the angle between the utility line voltage $E_U$ and the inverter output voltage $E_i$ is $\beta$, with the inverter voltage lagging. The voltage $E_L$ across the inductance is the vector difference between the vectors $E_U$ and $E_i$, and hence is a vector joining the heads of the vectors of the latter two quantities, as shown. The inductance current $I_L$, for a substantially lossless inductance, is at right angles to $E_L$ and the load current $I_O$ is assumed to lag the inverter voltage by a load power factor angle $\theta$. The inverter current $I_i$ is equal to the vector difference between the load current $I_O$ and the inductance current $I_L$, as shown in the drawing. Also shown is the angle $\alpha$ by which $I_L$ lags $E_U$.

Figure 6:
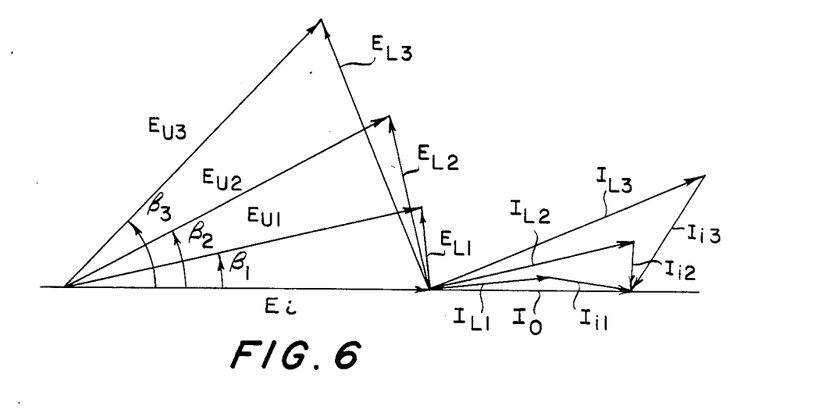

FIG. 6 illustrates the effects produced by changing the angle $\beta$ between the utility line voltage $E_U$ and the inverter output voltage $E_i$; the magnitudes of $E_U$ and $E_i$ are equal, and for simplicity the case is shown wherein the load power factor is unity.

As shown, when $\beta$ is small (e.g. $\beta = \beta_1$), the input or inductor current $I_{L1}$ is also small; the inverter current $I_{i1}$ is nearly in phase with the inverter voltage $E_i$ and therefore the inverter is delivering real power to meet the power requirements of the load not supplied by the utility line; thus, in this case the inverter battery is discharging.

When $\beta$ is somewhat larger ($\beta = \beta_2$), $I_{L2}$ is considerably larger and, in fact, its real part (i.e. its projection along the horizontal axis) is equal to $I_O$, and the utility supplies all of the load power. Since $I_{i2}$ is at 90° to the inverter voltage $E_i$, no real power flows into or out of the inverter and therefore the battery current is zero (ignoring losses). However, there is a substantial reactive current in the inverter, as depicted by the vector $I_{i2}$. This condition in which substantially no real power flows in or out of the inverter we designate as the "break even" case.

For a still larger input voltage displacement angle ($\beta = \beta_3$), $I_{L3}$ is substantially larger, as is the inverter current $I_{i3}$; however, the direction of the vector $I_{i3}$ indicates that real power is flowing into the inverter, while the inverter battery is being charged during such operation at the angle $\beta_3$.

As is seen from FIG. 6, varying the input displacement angle $\beta_0$ significantly changes the magnitude of the inverter current $I_i$. Table 1 hereof summarizes the variation of $\beta$ and $I_i$ for different full load power factors and values of input inductance ($L_S$). This table was computed assuming an 83% efficient inverter for both the "break even" (battery charging current and real inverter power=0) and "battery charging" (charge current or real inverter power=0.2 P.U.) cases, wherein P.U. indicates per unit, i.e. all parameters including inductance have been normalized to the load voltage and current.

The input voltage displacement angle $\beta$ for any given load, input voltage, and charge current condition increases with increasing value of the inductance $L_S$. However, at -15% utility voltage ($E_U = 0.85$), inverter current is minimal when $L_S$ equals 0.4 P.U. At this optimal inductance value, the inverter still must be sized to handle 130% fill load current (at "break even") when the load power factor is 0.8 lagging. Moreover, to charge the battery under these conditions requires an inverter rated at 150%.

Figure 7:
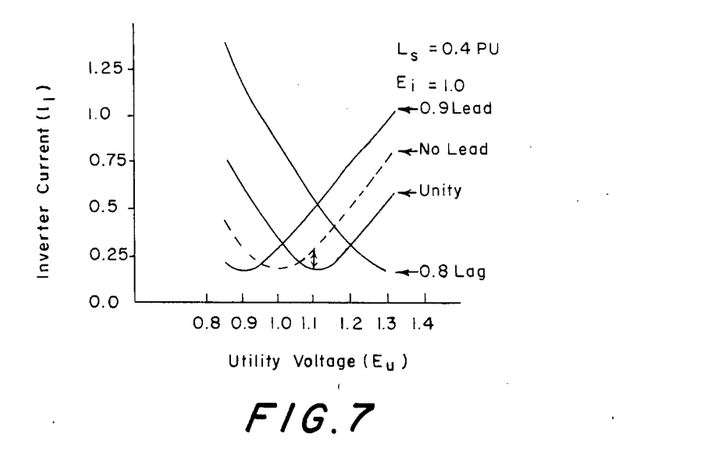
FIG. 7 is a graph illustrating inverter current plotted against utility supply voltage.

FIG. 7 illustrates the variation of inverter current as a function of input voltage (normalized), at the break-even operation condition. It is noted that for unity power factor, inverter current is minimum when the input or utility voltage $E_U$ is equal to 1.1 P.U. In accordance with the present invention the system performance is improved by scaling or transforming the input utility voltage upward by a factor of 1.1, as shown in FIG. 8.

Figures 8, 9, 10A:
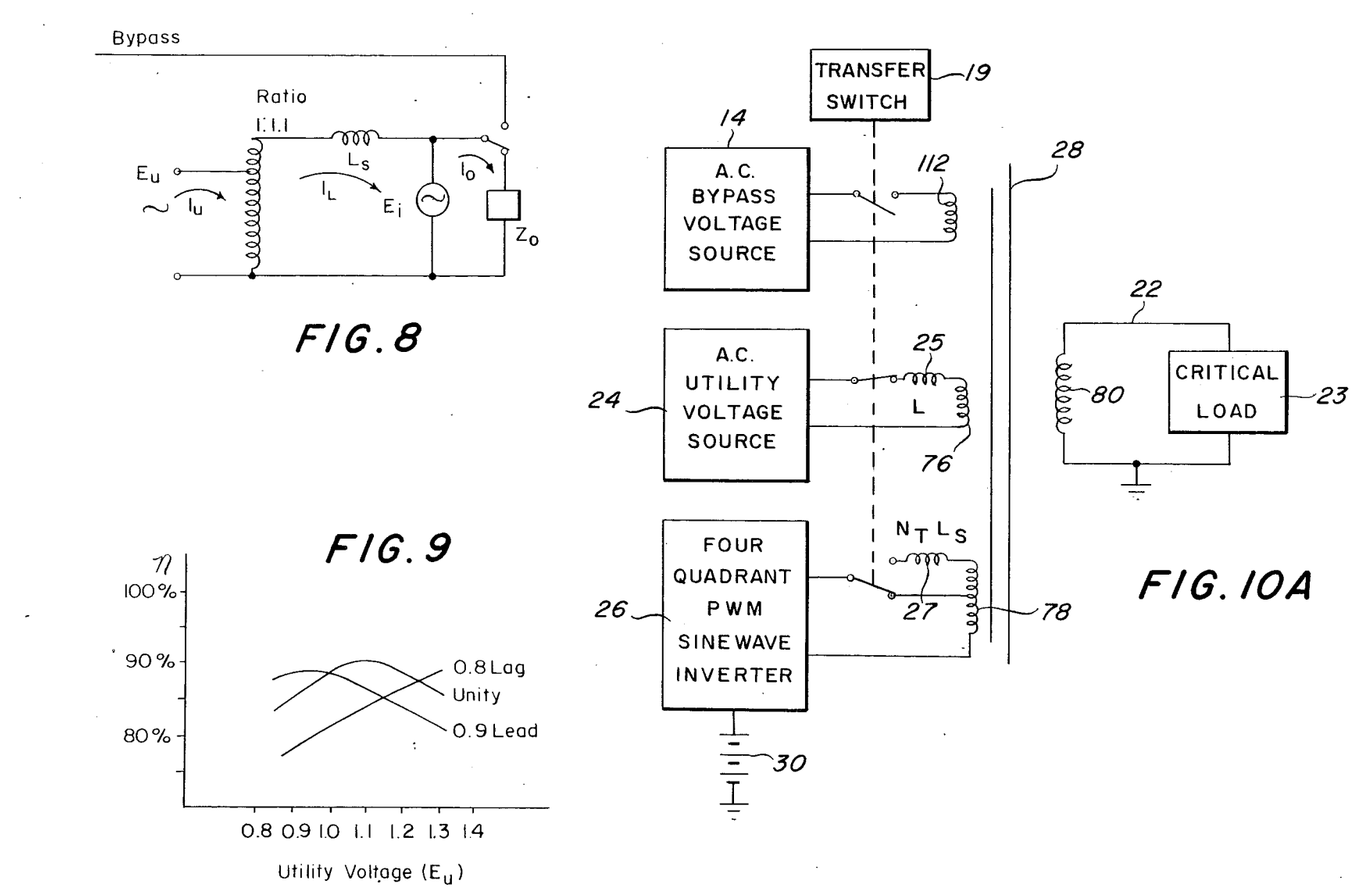
FIG. 8 is an electrical equivalent circuit illustrating the voltage step-up provided by the transformer coupling means.
FIG. 9 is a graph illustrating through-put efficiency plotted against utility supply voltage.
FIGS. 10A and 10B are electrical circuit diagrams illustrating power factor control by the use of separate inductance means and transformer shunt means, respectively.

Thus FIG. 8 shows a system according to the invention in equivalent circuit form, with a step-up of 1 to 1.1 in voltage between the line voltage terminals and the input to the inductance $L_S$, (in this equivalent circuit, shown as if it were provided by an auto transformer connection). At this ratio of 1.1, inverter current at no load is actually higher than a full load, as indicated by the two-headed arrow in FIG. 7.

Table 2 shows the reduction in the required inverter current when the input voltage has been transformed by the 1.1 ratio. Included in this Table is the input power factor angle $\alpha$ between $E_U$ and $I_L$. As indicated, the input power factor actually improves at -15% line voltage, viz, when $E_U = 0.935$ ($1.1 \times 0.85$).

The effect of transforming the input voltage in this manner is further illustrated in FIG. 9, wherein the through-put efficiency is plotted as ordinate and the normalized utility voltage $E_U$ is plotted as abscissa, for an 83% efficient inverter. Throughput efficiency is maximum approximately when the inverter current is minimum, at a transformed input voltage of about 1.1. The values indicated were calculated for a 120-volt, 3 kilovolt-ampere system. From this it will be seen that, for a unity power-factor load, the 1.1 ratio gives substantially maximum through-put efficiency, and gives reasonable efficiencies for both 0.8 lag power factor and 0.9 lead power factor. For other loads having different power factors, maximum through-put and minimum "break-even" inverter current may be obtained by using other suitable ratio values.

FIG. 10A is a diagram similar to FIG. 3 but illustrating a class of equipment to which the invention is applicable. In this case the utility line 24 supplies alternating voltage to the four-quadrant PWM sinewave inverter 26 via a series inductance 25, and the output of the inverter is connected through the transformer coupling means 28 to the critical load 22. The battery 30 is connected with the inverter 26, and the inverter determines how much of the critical load current is supplied from the utility line and how much from the battery, and how much of the inverter current is supplied to charge the battery.

The system of this figure is shown in its normal operating condition. When operating in the bypass mode, the transfer switch 19 is operated, whereby bypass source 14 is connected with the transformer coupling means 28, utility source 24 is disconnected from winding 76, and the inverter is connected to the coupling means through $N_T L_S$ inductor 27 that is sized to reflect the turns ratio of the coupling means so as to appear to the inverter exactly as before when operating from the utility 24 with inductor 25. This enables the inverter to recharge and maintain the battery at the desired level even when the load is connected with the bypass source.

Figure 10B:
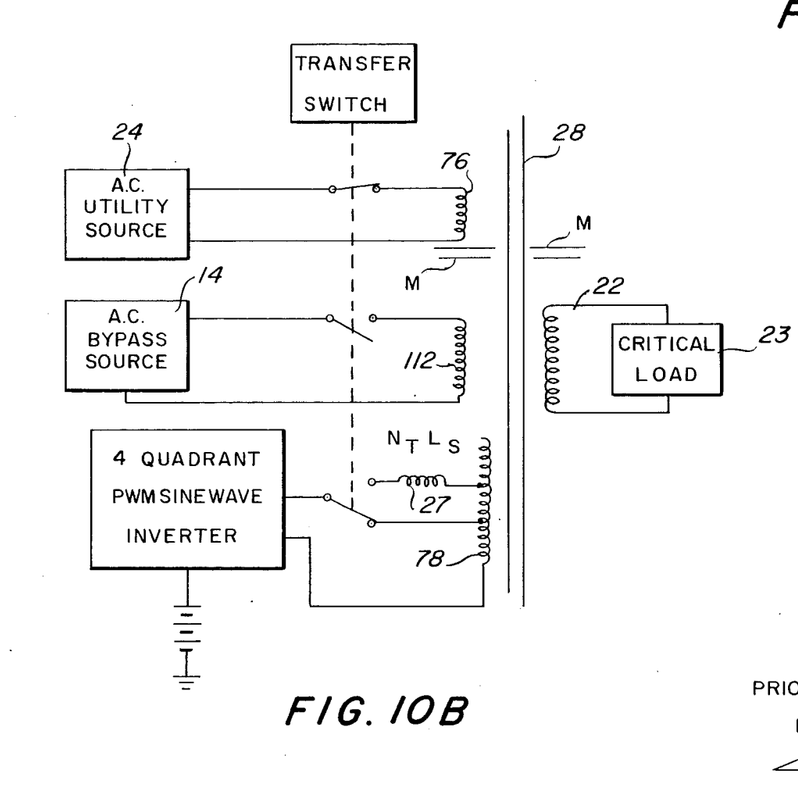

In the modification of FIG. 10B, instead of providing an inductor $L_S$, magnetic shunts M having the same effective inductance are inserted in the transformer coupling 28. The critical load winding 80, inverter winding 78 and bypass winding 112 are tightly coupled together, the utility source winding 76 being loosely coupled to the other windings. The degree of coupling is selected to be equivalent to the discrete inductor $L_S$ of FIG. 10A.

The system has been discussed above predominately with equal voltages in and out. The transformer enables one to convert one AC voltage to another, as is well known in the art. However, when the voltage ratio is changed for the input winding of the machine, the value of $L_S$ is automatically scaled to the correct value required by the input voltage. It is equally possible to alter any one of the windings of the transformer to produce any desired critical load voltage from any input voltage and in event of a heavy load demand bypass to an alternate source of a third voltage, if desired.

Figure 11:
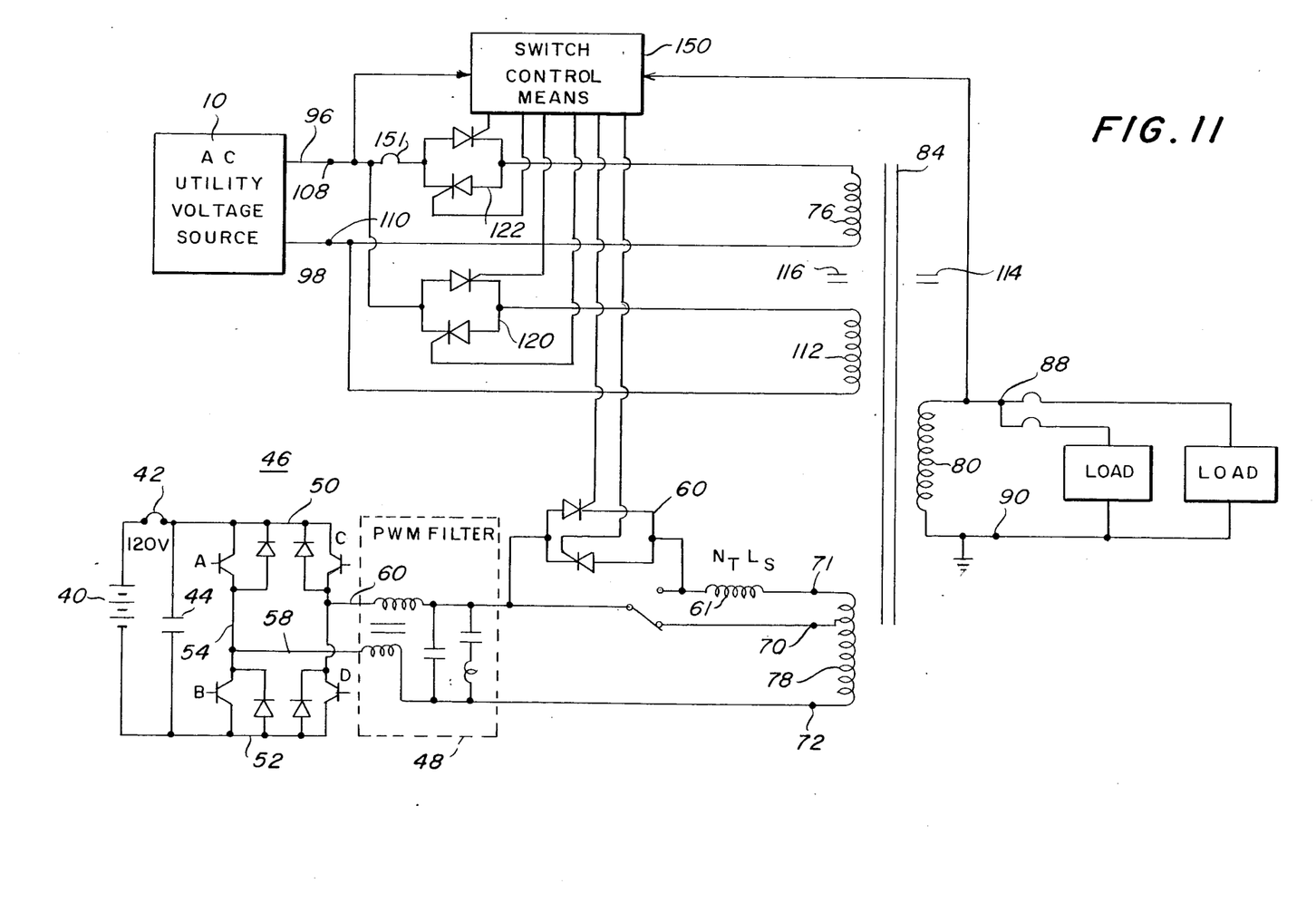
FIG. 11 is a schematic electrical diagram of the preferred embodiment of the invention.

Turning now to FIG. 11, there is shown a preferred embodiment of the invention for the typical case of utility voltage of 120 volts AC, a load voltage of 120 volts AC, a load power requirement of three KVA at 60 hz, and a load power factor of unity. A battery 40, in this example providing 120 volts DC, is connected via an appropriate fuse 42 to a shunt capacitor 44, typically having a value of about 15,000 microfarad. Also connected across the battery is the four-quadrant PWM sinewave inverter 46 made up of the PWM filter 48 and the four transistor-diode sections A, B, C and D arranged in a bridge configuration, where the battery is connected between the top and bottom junctions 50, 52 of the bridge and the opposed side junctions 54 and 56 of the bridge are connected with the respective input lines 58 and 60 of the PWM filter. Each of the bridge sections A, B, C and D is made up of a high current NPN switching transistor having a high-current semiconductor diode in parallel therewith.

In each of the upper sections A and C of the bridge, the collectors of the two transistors are connected with the positive side of the battery, and the emitters are connected with bridge output lines 58 and 60, respectively. The two diodes in the upper sections A and C are poled so that their cathodes are connected with the positive end of the battery, and the transistors and diodes in the lower bridge sections B and D are poled oppositely from those in sections A and C. Such circuits and their operation are well known in the art for use as PWM inverters. In such operation, the bases of the four switching transistors are turned ON and OFF in pairs in a predetermined sequence at predetermined times and for predetermined intervals (in this example, 26 times per sinewave cycle), so that the output leads 58 and 60 of the bridge circuit are provided with pulse-width modulated pulse signal having energies representing a sinewave, which signal after passage through the low-pass PWM filter 48 therefore produces a sinewave in response to energy from the battery. In a typical case, each of the capacitors $C_T$ and $C_F$ of the filter may have a value of about 200 microfarad, the inductance of each of the two coils $L_F$ may be about 400 microhenries and the inductance of the coil $L_T$ may be about 13 microhenries, producing a low-pass filter having an upper band limit at about 3 KHz and a rejection trap at the carrier frequency of the PWM pulses. The output terminals 70, 72 of the inverter are connected across the first input winding 78 of a transformer 84 via transfer switch 19. In a typical case, the transformer winding 78 may have a number of turns equal to about ½ of the number of turns of the load winding 80 which supplies power to the load (that is, if the number of turns of winding 80 is $N_2$ then the number of turns of inverter output winding 78 equals ½ $N_2$). During operation, the utility line is connected to second input winding 112 through a static switch means 120. In the typical case transformer winding 112 has the same number of turns as winding 80. Also in the bypass mode, the inverter is connected with transformer winding terminals 71 and 72 through AC switch means 60 and inductor 61, permitting the inverter to operate from winding 78 of transformer 84 as if it were the utility line.

Transformer windings 112, 78 and 80 are tightly coupled to each other, e.g., may be wound one on top of the other on a common iron core 84 so that the inverter output voltage is the load voltage. Transformer winding 80 is connected directly to the load input terminals 88 and 90. All static switches 120, 60 and 122 are used to permit more rapid switching from the UPS unit to the alternate sources. They are made up of a pair of parallel, oppositely-poled silicon-controlled-rectifiers each of which can be triggered on by signals applied to its gate electrode, the pair thus serving as a bidirectional electronic switch, operable in response to electrical signals indicative of any selected malfunction, such as a large change in load voltage due to load voltage due to a load disturbance.

The portion of FIG. 11 thus far described in detail represents, in its general form, a known type of inverter system for operating a critical AC load from a battery and for charging the battery from an AC source, and hence need not be described in even further detail.

Figure 12:
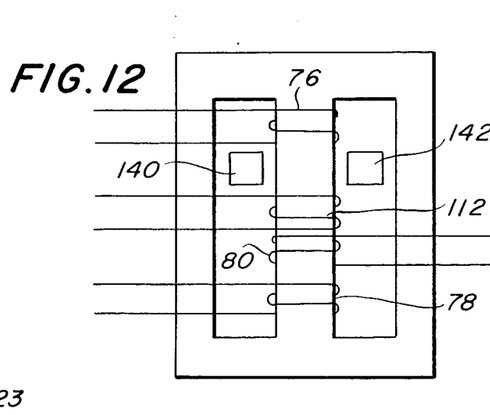
FIG. 12 is a diagrammatic illustration of the coupling of the transformer windings of the apparatus of FIG. 11.

The AC utility line, made up of the high line 96 and the neutral line 98 is connected, via utility line input terminals 108 and 110, to transformer third input winding 76, which is located on the same core as the windings 112, 80 and 78 but is loosely coupled thereto by virtue of the intervening magnetic shunts 114 and 116, which typically comprise bodies of ferro-magnetic material positioned to shunt or bypass a portion of the magnetic flux which otherwise would extend between coil 76 and the coils 112, 80 and 78; each magnetic shunt is designed to provide at least a small air gap on each side of the shunt so that complete shunting does not occur. Such constructions and procedures are well known in the art and need not be described herein in detail, and a physical arrangement of such a transformer is illustrated schematically in FIG. 12, wherein the transformer winding are designated by the same numerals as previously and the magnetic shunts are designated as 140 and 142. This decoupling by the inductance permits the vectors representing the voltages of winding 112 and at winding 78 to be independently adjusted.

Such types of systems, their backgrounds and the theory of their operation are described, for example in G. J. Smollinger and W. J. Raddi, "Reverse Energy Through an A.C. Line Synchronized Pulse Width Modulated Sine-Wave Inverter", *Intelec* 81, pp. 126–131; R. Rando, "AC Triport—A New Uninterruptible AC Power Supply", *Intelec* 78, pp. 50–58; G. E. Neajsm "A Stored-Program Controlled Triport UPS", *Intelec* 81, pp. 210–215; and Z. Noworolski and K. Goszyk, "High Efficiency Uninterruptible Power Supply", 4th International PCI Conference on Power Conversion, March, 1982, pp. 521–529.

In the embodiment of FIG. 11, the connection between the high utility line 96 and winding 76 includes a series fuse 151 and an AC disconnect switch 122, similar in form to the static bypass switch means 120 and AC switch means 60, that are similarly operable, when desired, by electrical signals applied by switch control means 150 to the gate electrodes of the SCR's. For example, when the utility line fails, switch 122 is automatically opened and the load is supplied with AC power entirely from the battery and inverter.

In this embodiment of the invention, the ratio R of the number of turns $N_2$ of transformer output winding 80 to the number of turns $N_1$ of transformer input winding 76 is other than unity, i.e., $N_2/N_1=1.1$. The significance of this will now be described with respect to FIGS. 8, 13 and 14, especially.

The simplified equivalent circuit illustrated in FIG. 8 is applicable to the system of FIG. 11, the ratio $N_2/N_1$ of the turns of the windings 80 and 76 being represented by the tap position on an auto transformer which, in effect, increases the line voltage applied to the input end of inductance $L_S$ from $E_U$ to a 10% higher value $E_U'$. The series inductance $L_S$ is effectively provided, in the example of FIG. 11, by the transformer 84 and the magnetic shunts 114, 116 built into it. As described previously with respect to FIGS. 7 and 9, this step-up ratio of 1.1 minimizes the break-even inverter current required by the system during normal operation and maximizes the through-put efficiency.

The transformer 84 in this example is of EI construction, with the magnetic shunts described previously serving to attenuate the magnetic path between winding 76 and windings 112, 78 and 80, in this example giving an effective value for $L_S$ of about 5 millihenries.

Figure 13A:
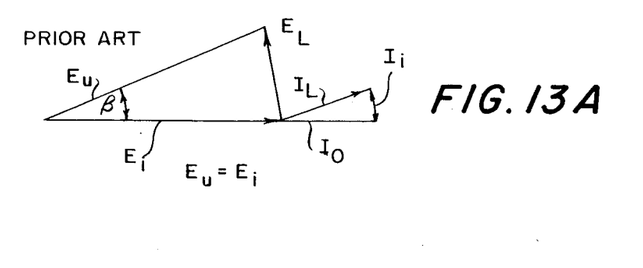
FIGS. 13A and 13B are vector diagrams further illustrating the operation of the invention of FIG. 11.
Figure 13B:
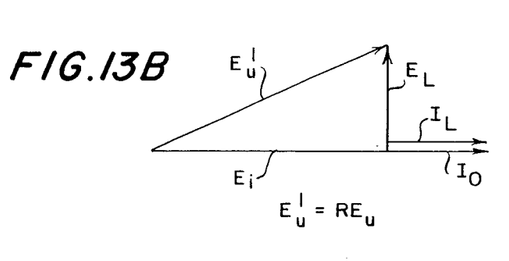

FIGS. 13A and 13B illustrate from a different viewpoint the operation and effect of the line voltage step-up employed according to the present invention. FIG. 13A illustrates the phase relationships in a typical prior-art apparatus in which $E_U = E_i$ and $E_i$ lags $E_U$ (for example, by 23° in a typical operating condition). The difference vector $E_L$ again represents the voltage across the series inductance $L_S$, and the current through that inductance is represented by the vector $I_L$ at right angles thereto. The output current in this example is assumed to be in phase with the inverter output voltage (i.e., the load is unity power factor) so that the $I_O$ vector lies along the same direction as the $E_i$ vector as shown. The difference vector $I_i$ then represents the substantial circulating current in the inverter, which always exists under these conditions even though no real power is then being delivered to or from the inverter.

FIG. 13B shows conditions existing in a comparable system modified in accordance to the present invention so that the line voltage $E_U$ is, in effect, transformed upwardly by a factor 1.1 to a new value $E_U'$, this increased value of $E_U'$ being sufficient so that the $E_L$ vector is vertical and the $I_L$ vector, being at right angles to $E_L$, lies directly along the direction of the inverter current $I_O$ and is equal thereto. It therefore supplies all of the load current, leaving no current, reactive or real, in or out of the inverter, as is desired to produce the previously-described improvements with regard to minimizing inverter current and improved through-put efficiency.

It can be seen from FIGS. 13A and 13B that varying the length of $E_U'$ exerts an action as if the $E_L$ and $I_L$ vectors were fixed at right angles to each other but rotatable together about the end of the $E_i$ vector so that, by appropriate selection of the length of $E_U'$, $I_L$ can be turned into alignment with $I_O$ regardless of the direction of $I_O$, which direction may vary depending upon the load factor, for example.

Figure 14:
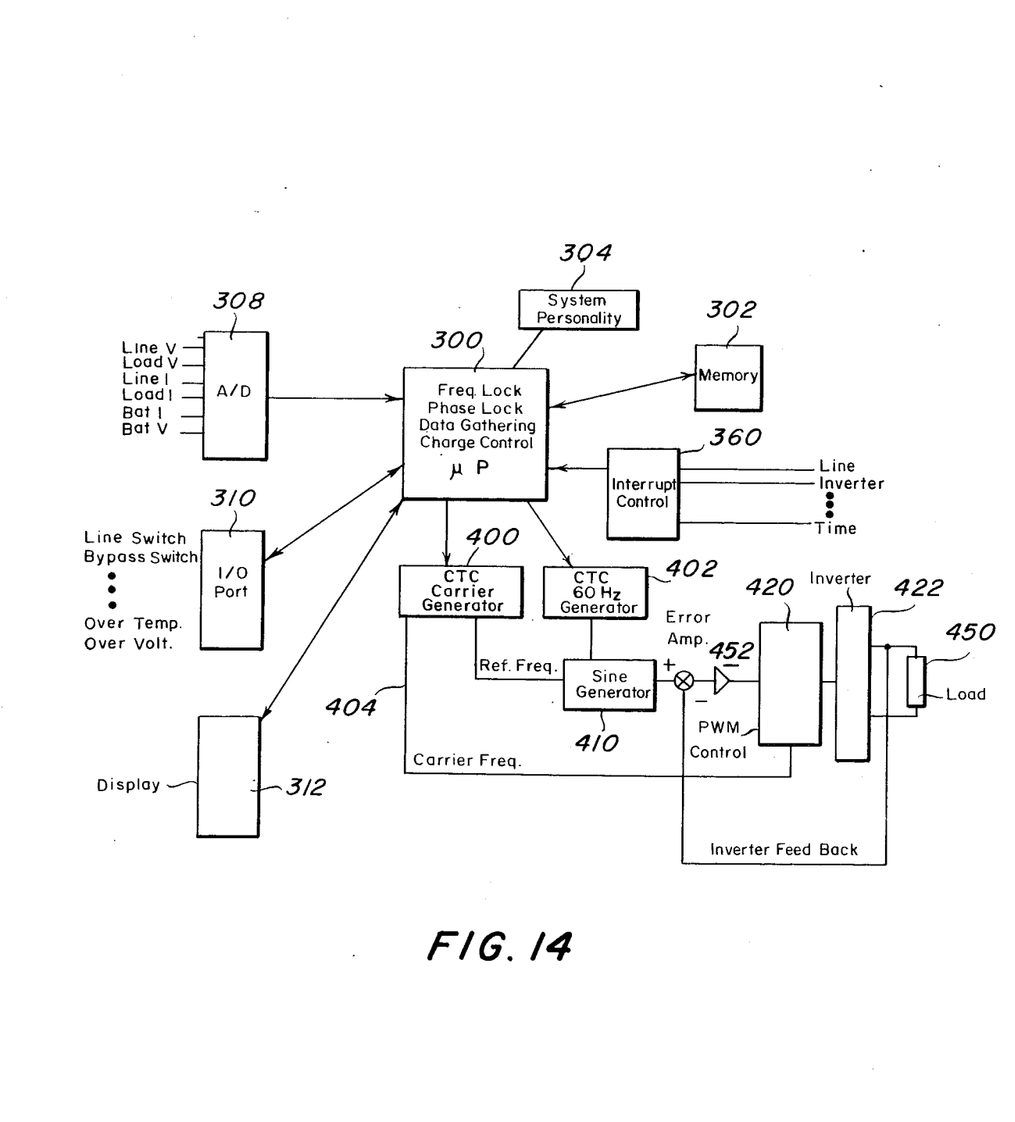
FIG. 14 is a block diagram of a system incorporating the power supply of the present invention.

FIG. 14 illustrates by way of example one type of system in which the UPS of the present invention may be included. In this case a microprocessor 300, such as a Z80 microprocessor chip, controls the frequency and phase $\beta$ of the inverter output sinewave is supplied with appropriate program memory information from memory 302; with system personality information indicative of the particular application parameters from system personality 304; with digital information with respect to line voltage, load voltage, line current, load current, battery current and battery voltage from A/D device 308; with a variety of monitoring information with respect to conditions of the line switch, the bypass switch, over-temperature, over-voltage or any other parameters which it is desired to monitor, by way of I/0 port 310; and with a mutual interchange of information with an appropriate display device 312. The microprocessor also preferably receives information from an interrupt control 310 with respect to such parameters as line voltage, inverter voltage, time and any other parameters found desirable. In this example, the microprocessor controls a counter timer chip (CTC) carrier generator 400 and a CTC 60 Hz generator 402, which operate to produce on line 404 a carrier frequency equal to the repetition rate of the pulse-width modulated pulses (typically at 26 times the 60 Hertz line frequency) and to produce from sine generator 410 a substantially pure sinewave function at utility-line frequency and of the desired 120-volt magnitude. The PWM control 420 controls the inverter 422, which in this case is assumed to be the entire circuit of FIG. 11, so as to determine the phase and the widths of the pulses which turn on the transistors in the PWM bridge circuit. An inverter feedback connection extends from the load 450 to a comparison or error amplifier circuit 452 which detects and amplifies any differences between the voltage fed back from the inverter and the idealized sinewave from sine generator 410, this difference then being fed to PWM control 420 in a polarity and amount to correct any deficiencies in the sinewave appearing at the load. Normally the sinewave is locked to the utility line sinewave. However, to provide a suitable sinewave to the comparison circuit upon a utility line outage, the microprocessor includes a stable crystal-controlled reference oscillator, powered by the battery, from which the desired ideal sinewave at the desired line frequency is derived.

The microprocessor maintains frequency lock between the sinewave reference and the utility as well as manipulating the displacement phase angle between them. It also examines all system parameters and compares them against preset software limits. The user can access these system parameters through a front graphics display panel.

Figure 15A:
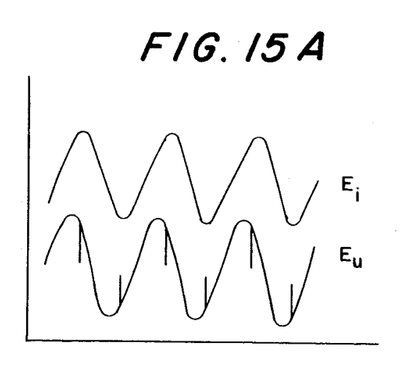
FIGS. 15A and 15B are waveform diagrams illustrating the bidirectional line conditioning obtained by the system of the present invention.
Figure 15B:
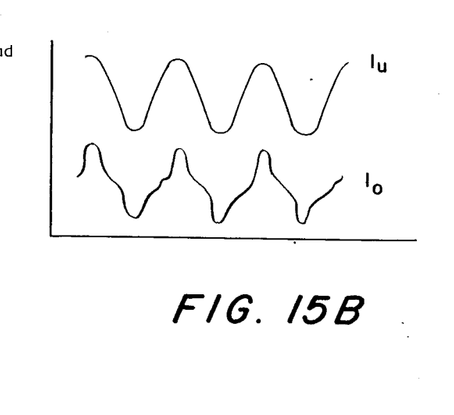

FIGS. 15A and 15B illustrate the bidirectional line conditioning obtained with the isolated system of the present invention. As shown in FIG. 15A, if the line voltage $E_U$ consists of a sinewave with the noise spikes shown thereon, the inverter voltage $E_i$ supplied to the load has the substantially pure sinewave appearance shown in the latter figure; FIG. 15B shows that even if the load current $1_0$ were distorted as shown, this would not reflect back into, or substantially distort, the utility supply line current $1_U$, which remains a substantially pure sinewave.

The preferred embodiment of the invention has been shown as utilizing a transformer in which magnetic shunts provide the effective series inductance $L_S$, and the voltage step-up R is provided by the ratio $N_2/N_1$ in the number of turns of entirely separate and isolated transformer windings. However, many of the advantages of the invention with regard to minimizing inverter current and maximizing through-put can be obtained where the series inductance $L_S$ is in fact a real lumped-circuit series inductor connected between the high side of the line and the inverter output, much as represented schematically in the simplified equivalent circuit of FIG. 8, and it is in fact possible to utilize an auto transformer as suggested by the equivalent circuit of FIG. 8 rather than the completely isolated transformer winding arrangement of the preferred embodiment.

Also, although the ratio of $E_U'/E_U$ of 1.1 has been found preferable for many practical purposes, the minimum inverter current may in some instances occur at a different value than 1.1, in which case R may be differently chosen to minimize inverter current during break-even operation. That is, in some cases the load power factor may not be centered about unity, but may have a known average fixed value departing substantially from unity, in which case the value of R may be chosen to be substantially different from 1.1, so as to minimize the required inverter current during normal operation.

Thus while the invention has been described with respect to certain specific embodiments in the interest of complete definiteness, it will be understood that it may be embodied in a variety of forms diverse from those specifically shown and described without departing from the spirit and scope of the present invention.

TABLE 1

| $L_s$ | | Load PF = 1 | | Load PF = 0.8 lag | | Load PF = 0.9 load | |
|---|---|---|---|---|---|---|---|
| | | Breakeven | Charge | Breakeven | Charge | Breakeven | Charge |
| $E_U = 1.0$ | | | | | | | |
| 0.2 P.U. | $I_i$ | 0.19 | 0.39 | 0.77 | 0.87 | 0.34 | 0.49 |
| — | $\beta$ | 13° | 15.5° | 12° | 14° | 12° | 15.5° |
| 0.4 P.U. | $I_i$ | 0.31 | 0.55 | 0.86 | 1.01 | 0.25 | 0.36 |
| | $\beta$ | 27° | 33° | 24° | 29° | 25° | 30° |
| 0.6 P.U. | $I_i$ | 0.53 | 0.87 | 1.04 | 1.12 | 0.17 | 0.41 |
| | $\beta$ | 45° | 57° | 40° | 48° | 40° | 50° |
| $E_U = 0.85\ (-15\%)$ | | | | | | | |
| 0.2 P.U. | $I_i$ | 0.99 | 1.12 | 1.55 | 1.66 | 1.51 | 0.67 |
| | $\beta$ | 17° | 20° | 15° | 18° | 15° | 18° |
| 0.4 P.U. | $I_i$ | 0.77 | 1.02 | 1.29 | 1.46 | 0.25 | 0.49 |
| | $\beta$ | 34° | 42° | 30° | 36° | 29° | 36° |
| 0.6 P.U. | $I_i$ | 0.99 | 1.61 | 1.39 | 1.75 | 0.37 | 0.74 |
| | $\beta$ | 60° | 85° | 50° | 65° | 50° | 65° |

TABLE 2

| $L_s$ | | Load PF = 1 | | Load PF = 0.8 lag | | Load PF = 0.9 load | |
|---|---|---|---|---|---|---|---|
| | | Breakeven | Charge | Breakeven | Charge | Breakeven | Charge |
| $E_U = 1.1$ | | | | | | | |
| 0.4 P.U. | $I_i$ | 4.12 | 0.35 | 0.58 | 0.72 | 0.49 | 0.51 |
| | $\beta$ | 24° | 29° | 21° | 25° | 23° | 27° |
| | $\gamma$ | 24° | 24° | 25° | 25° | 25° | 24° |
| $E_U = 0.935\ (-15\%)$ | | | | | | | |
| 0.4 P.U. | $I_i$ | 0.52 | 0.72 | 1.03 | 1.21 | 0.12 | 0.35 |
| | $\beta$ | 30° | 36° | 26° | 32° | 26° | 32° |
| | $\gamma$ | 7° | 11° | 4° | 8° | 4° | 8° |

What is claimed is:

1. A stabilized power supply system for supplying alternating current power to a critical load, such as a computer, comprising:
   (a) transformer means including an output winding connected with the load, and first and second input windings;
   (b) first source means including a battery and an inverter for supplying alternating-current power;
   (c) second source means including a bypass voltage source for supplying alternating current power;
   (d) transfer switch means having first and second conditions for alternately connecting and disconnecting said first source with said first input winding and for disconnecting and connecting said second source with said second input winding, respectively;
   (e) third source means including a utility voltage source for supplying alternating-current power to said transformer means; and
   (f) means for varying the angular vector relationship between the voltages of said third ($E_U$) and first ($E_i$) sources to cause the real component of the inverter current ($I_i$) at the break-even condition to be a minimum, said vector relationship varying means comprises magnetic shunt means (M) for varying the coupling between the windings of said transformer means;
   (g) said transformer means also including a third input winding connected with said utility voltage source, said magnetic shunt means being arranged to at least partially isolate said third winding from said first and second windings.

2. Apparatus as defined in claim 1, and further including means for stepping up the voltage of said utility voltage source relative to that of said first source, thereby to minimize the break-even inverter current required by the system during normal operation, and to maximize the through-put efficiency.

3. Apparatus as defined in claim 1, wherein said vector relationship varying means comprises an inductance (L).

4. Apparatus as defined in claim 1, wherein said voltage step-up means includes an autotransformer.

5. Apparatus as defined in claim 1, wherein said transformer means includes a third input winding connected with said utility voltage source, the number of turns of said output winding being greater than that of said third input winding to produce the desired step-up voltage.

6. Apparatus as defined in claim 1, and further including means operable by said transfer switch means for connecting between said inverter and said first winding a dummy inductance ($N_TL_S$) so dimensioned as to correspond with the inductance that is produced when the utility source is connected with said third winding, thereby to permit the inverter to recharge the battery even when the load is connected with the bypass source.

7. Apparatus as defined in claim 6, wherein said inverter comprises a four-quadrant pulse-width-modulated sinewave inverter.

8. Apparatus as defined in claim 7, wherein said transfer switch means includes for each input winding a pair of oppositely poled controlled-diode rectifiers connected in parallel, and switch control means for operating said diodes in response to system malfunction.

* * * * *